United States Patent
Wu

(10) Patent No.: US 9,723,202 B2
(45) Date of Patent: Aug. 1, 2017

(54) ELECTRONIC DEVICE AND IMAGE CAPTURING METHOD USING THE SAME

(71) Applicant: Chiun Mai Communication Systems, Inc., New Taipei (TW)

(72) Inventor: Shang-Wei Wu, New Taipei (TW)

(73) Assignee: Chiun Mai Communication Systems, Inc., New Taipei (TW)

(*) Notice: Subject to any disclaimer, the term of this patent is extended or adjusted under 35 U.S.C. 154(b) by 0 days.

(21) Appl. No.: 14/842,306

(22) Filed: Sep. 1, 2015

(65) Prior Publication Data

US 2016/0142628 A1    May 19, 2016

(30) Foreign Application Priority Data

Nov. 17, 2014 (CN) .......................... 2014 1 0655466

(51) Int. Cl.
*H04N 5/232* (2006.01)
(52) U.S. Cl.
CPC .............................. *H04N 5/23222* (2013.01)
(58) Field of Classification Search
CPC ........ H04N 5/23222; G06K 9/34; G06K 9/62; G06K 9/6201; G06K 9/6202; G06K 9/6203; G06K 9/6204; G06K 9/6205; G06K 9/6206; G06K 9/6207; G06K 9/6209; G06K 9/621; G06K 9/6211
See application file for complete search history.

(56) References Cited

U.S. PATENT DOCUMENTS

| | | | |
|---|---|---|---|
| 2009/0009613 A1* | 1/2009 | Chien ................ | H04N 5/23248 348/208.1 |
| 2012/0075503 A1* | 3/2012 | Akifusa ................ | H04N 5/772 348/231.99 |
| 2014/0307980 A1* | 10/2014 | Hilt ........................ | G06T 11/60 382/284 |

* cited by examiner

*Primary Examiner* — Mekonnen Dagnew
(74) *Attorney, Agent, or Firm* — Steven Reiss

(57) ABSTRACT

A method of capturing images includes pre-storing a plurality of image templates in a storage device, wherein each of the plurality of image templates includes a predetermined subject. An area of the predetermined subject in each of the plurality of image templates is predetermined. One of the image templates is invoked from the storage device. The predetermined subject of the invoked image template is hollowed according to the area of the predetermined subject, and a hollowed area of the invoked image template is obtained. A captured image is obtained. Once a size of the captured image is adjusted to be equal to a size of the hollowed area of the invoked image template, the hollowed area of the invoked image template is filled with the captured image.

18 Claims, 3 Drawing Sheets

ELECTRONIC DEVICE AND IMAGE CAPTURING METHOD USING THE SAME

CROSS-REFERENCE TO RELATED APPLICATIONS

This application claims priority to Chinese Patent Application No. 201410655466.5 filed on Nov. 17, 2014, the contents of which are incorporated by reference herein.

FIELD

The subject matter herein generally relates to image capturing technology, and particularly to an electronic device and a method for capturing images using the electronic device.

BACKGROUND

A user can use an electronic device to capture images. However, the electronic device cannot provide the user with image templates that include different subjects, when the user uses the electronic device to capture images.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
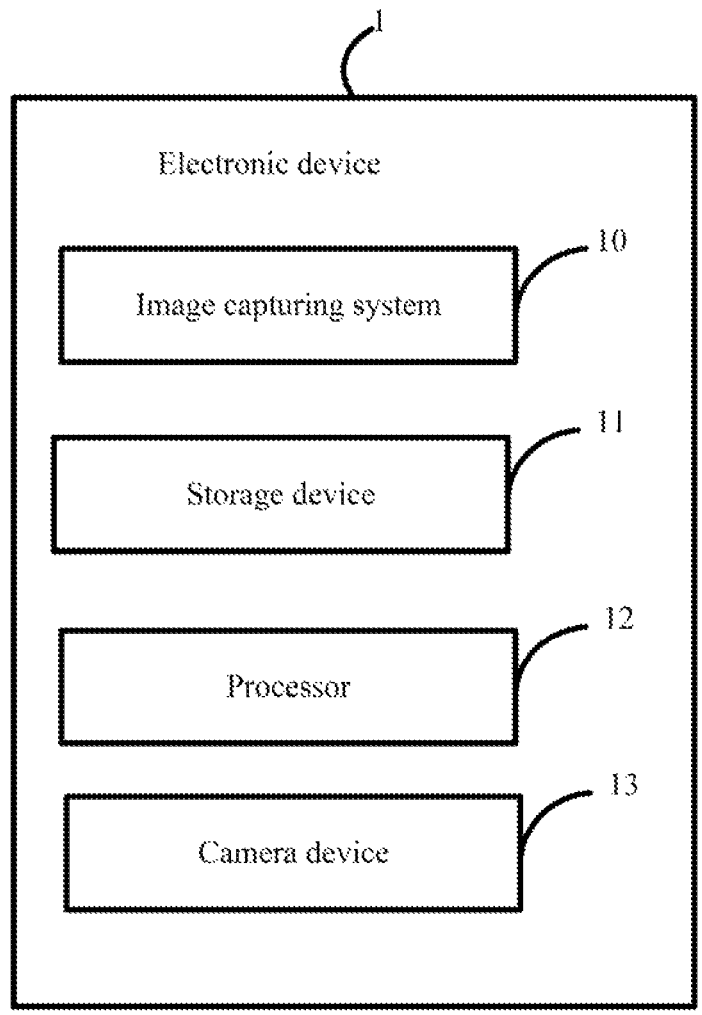
FIG. 1 is a block diagram of one embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

FIG. 1 is a block diagram of one embodiment of an electronic device. Depending on the embodiment, an electronic device 1 includes an image capturing system 10, a storage device 11, at least one processor 12, and a camera device 13. The electronic device 1 can be a smart phone, a personal digital assistant (PDA), a tablet computer, or any other suitable electronic device. FIG. 1 illustrates only one example of the electronic device 1 that can include more or fewer components than illustrated, or have a different configuration of the various components in other embodiments.

The storage device 11 can be used to store information of the electronic device 1. In one embodiment, the storage device 11 can pre-store a plurality of image templates. In one embodiment, each of the plurality of image templates can be an image including a predetermined subject such as an outdoor scene, or a portrait-type image of a human for example. "Predetermined subject" hereinafter denotes the central thing or central point of interest within an image. The image capturing system 10 can predetermine an area of the predetermined subject in each of the plurality of image templates.

In one embodiment, the storage device 11 can be an internal storage device, such as a flash memory, a random access memory (RAM) for temporary storage of information, and/or a read-only memory (ROM) for permanent storage of information. The storage device 11 can also be an external storage device, such as an external hard disk, a storage card, or a data storage medium.

The at least one processor 12 can be a central processing unit (CPU), a microprocessor, or other data processor chip that performs functions of the electronic device 1.

The image capturing system 10 can control the camera device 13 to capture an image to be framed in one of the image templates stored in the storage device 11. Details will be given in the following paragraphs.

Figure 2:
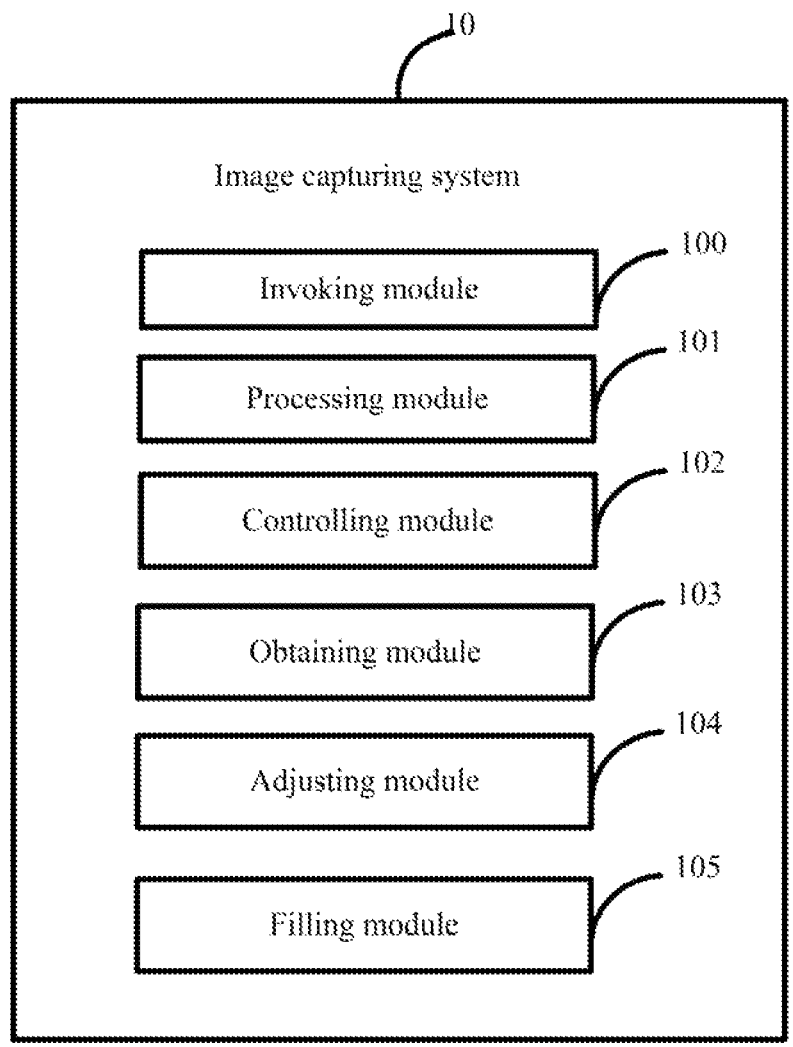
FIG. 2 is a block diagram of one embodiment of functional modules of an image capturing system.

FIG. 2 is a block diagram of one embodiment of functional modules of the image capturing system 10. In at least one embodiment, the image capturing 10 can include an invoking module 100, a processing module 101, a controlling module 102, an obtaining module 103, an adjusting module 104, and a filling module 105. The function modules 100-105 can include computerized codes in the form of one or more programs, which are stored in the storage device 11, and are executed by the at least one processor 12 of the electronic device 1 to provide functions of capturing an image and amalgamating the captured image with one of the image templates stored in the storage device 11.

The invoking module 100 can create a plurality of image templates and store the plurality of image templates in the storage device 11. Each of the plurality of image templates can be an image including a predetermined subject such as an outdoor scene, or a portrait-type image of a human for example. The invoking module 100 can further predetermine an area of the predetermined subject in each of the plurality of image templates.

The invoking module 100 can invoke one of the image templates from the storage device 11 according to a user selection.

For example, when a user selects an image template "A" having a particular predetermined subject such as the outdoor scene from the storage device 11, the invoking module 100 can invoke the image template "A" from the storage device 11.

In one embodiment, the invoking module 100 can further indicate the predetermined subject and the area of the predetermined subject in the invoked image template. For example, the invoking module 100 can indicate the predetermined subject of the image template "A" using a line of indication. The invoking module 100 can indicate the area of the predetermined subject of the image template "A" by drawing a dotted line on an edge of the area.

The processing module 101 can hollow the predetermined subject of the invoked image template according to the area of the predetermined subject, then the processing module 101 can obtain a hollowed area of the invoked image template.

The controlling module 102 can control the camera device 13 to capture an image according to a user operation. In one embodiment, the user operation can be an operation of focusing a lens of the camera device 13, to ensure a size of the captured image can be substantially commensurate with a size of the hollowed area of the invoked image template.

The obtaining module 103 can obtain the captured image.

The adjusting module 104 can adjust the size of the captured image according to the size of the hollowed area of the invoked image template.

In one embodiment, when the size of the captured image is less than the size of the hollowed area of the invoked image template, the adjusting module 104 can enlarge the captured image to ensure that the size of the captured image is equal to the size of the hollowed area of the invoked image template.

In one embodiment, when the size of the captured image is greater than the size of the hollowed area of the invoked image template, the adjusting module 104 can reduce the captured image to ensure that the size of the captured image is equal to the size of the hollowed area of the invoked image template.

In another embodiment, when the size of the captured image is greater than the size of the hollowed area of the invoked image template, the adjusting module 104 can crop or cut an edge of the captured image to ensure that the size of the captured image is equal to the size of the hollowed area of the invoked image template.

The filling module 105 can fill the hollowed area of the invoked image template with the captured image to generate a complete image, when the size of the captured image is adjusted to be equal to the size of the hollowed area of the invoked image template.

Figure 3:
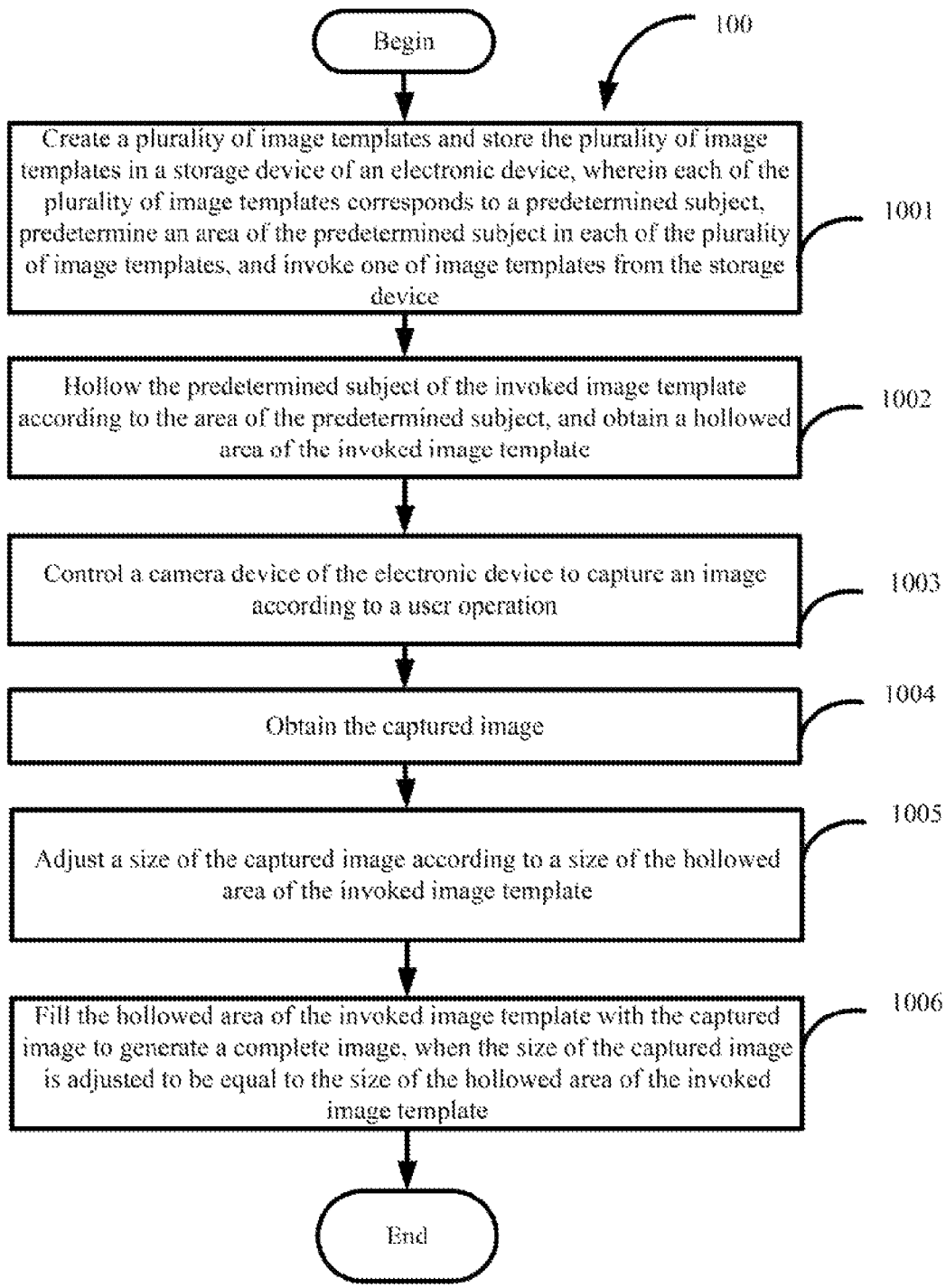
FIG. 3 illustrates a flowchart of one embodiment of a method for capturing images using the electronic device of FIG. 1.

FIG. 3 illustrates a flowchart which is presented in accordance with an example embodiment. The example method 100 is provided by way of example, as there are a variety of ways to carry out the method. The method 100 described below can be carried out using the configurations illustrated in FIG. 1, for example, and various elements of these figures are referenced in explaining example method 100. Each block shown in FIG. 3 represents one or more processes, methods, or subroutines, carried out in the exemplary method 100. Additionally, the illustrated order of blocks is by example only and the order of the blocks can be changed according to the present disclosure. The exemplary method 100 can begin at block 1001. Depending on the embodiment, additional steps can be added, others removed, and the ordering of the steps can be changed.

At block 1001, an invoking module can create a plurality of image templates and store the plurality of image templates in a storage device of an electronic device. Each of the plurality of image templates can be an image including a predetermined subject such as an outdoor scene, or a portrait-type image of a human for example. The invoking module can further predetermine an area of the predetermined subject in each of the plurality of image templates.

The invoking module can invoke one of the image templates from the storage device according to a user selection.

For example, when a user selects an image template "A" having the predetermined subject of outdoor scene from the storage device, the invoking module can invoke the image template "A" from the storage device.

In one embodiment, the invoking module can further indicate the predetermined subject and the area of the predetermined subject in the invoked image template. For example, the invoking module can indicate the predetermined subject of the image template "A" using a line of indication. The invoking module can indicate the area of the predetermined subject of the image template "A" by drawing a dotted line on an edge of the area.

At block 1002, a processing module can hollow the predetermined subject of the invoked image template according to the area of the predetermined subject, then the processing module can obtain a hollowed area of the invoked image template.

At block 1003, a controlling module can control the camera device to capture an image according to a user operation. In one embodiment, the user operation can be an operation of focusing a lens of the camera device to ensure that a size of the captured image can be substantially commensurate with a size of the hollowed area of the invoked image template.

At block 1004, an obtaining module can obtain the captured image.

At block 1005, an adjusting module can adjust the size of the captured image according to the size of the hollowed area of the invoked image template.

In one embodiment, when the size of the captured image is less than the size of the hollowed area of the invoked image template, the adjusting module can enlarge the captured image to ensure that the size of the captured image equal to the size of the hollowed area of the invoked image template.

In one embodiment, when the size of the captured image is greater than the size of the hollowed area of the invoked image template, the adjusting module can reduce the captured image to ensure that the size of the captured image equal to the size of the hollowed area of the invoked image template.

In another embodiment, when the size of the captured image is greater than the size of the hollowed area of the invoked image template, the adjusting module can cut an edge of the captured image to ensure that the size of the captured image is equal to the size of the hollowed area of the invoked image template.

At block 1006, a filling module can fill the hollowed area of the invoked image template with the captured image to generate a complete image, when the size of the captured image is adjusted to be equal to the size of the hollowed area of the invoked image template.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A computer-implemented image capturing method executable by at least one processor of an electronic device, the electronic device comprising a storage device and a camera device, the method comprising:
    invoking one image template from the storage device, wherein the image template corresponds to a predetermined subject, and an area of the predetermined subject in image templates is predetermined;
    hollowing the predetermined subject of the invoked image template according to the area of the predetermined subject;
    obtaining a hollowed area of the invoked image template;
    controlling the camera device to capture an image according to a user operation;
    obtaining the captured image; and
    filling the hollowed area of the invoked image template with the captured image to generate a complete image.

2. The method according to claim 1, further comprising:
    indicating the predetermined subject and the area of the predetermined subject in the invoked image template, before hollowing the predetermined subject of the invoked image template.

3. The method according to claim 1, wherein the user operation comprises focusing a lens of the camera device to ensure that a size of the captured image is substantially equal to a size of the hollowed area of the invoked image template.

4. The method according to claim 1, further comprising:
    adjusting a size of the captured image according to a size of the hollowed area of the invoked image template before filling the hollowed area of the invoked image template with the captured image.

5. The method according to claim 4, wherein the size of the captured image is adjusted by:
    enlarging the captured image when the size of the captured image is less than the size of the hollowed area of the invoked image template; and
    reducing the captured image when the size of the captured image is greater than the size of the hollowed area of the invoked image template.

6. The method according to claim 4, wherein the size of the captured image is adjusted by:
    cutting an edge of the captured image when the size of the captured image is greater than the size of the hollowed area of the invoked image template.

7. An electronic device comprising:
    a camera device;
    at least one processor; and
    a storage device configured to store one or more programs that, when executed by the at least one processor, cause the at least one processor to:
    invoking one image template from the storage device, wherein the image template corresponds to a predetermined subject, and an area of the predetermined subject in image templates is predetermined;
    hollow the predetermined subject of the invoked image template according to the area of the predetermined subject;
    obtain a hollowed area of the invoked image template;
    control the camera device to capture an image according to a user operation;
    obtain the captured image; and
    fill the hollowed area of the invoked image template with the captured image to generate a complete image.

8. The electronic device according to claim 7, wherein the one or more programs further cause the at least one processor to:
    indicate the predetermined subject and the area of the predetermined subject in the invoked image template, before hollowing the predetermined subject of the invoked image template.

9. The electronic device according to claim 7, wherein the user operation comprises focusing a lens of the camera device to ensure that a size of the captured image is substantially equal to a size of the hollowed area of the invoked image template.

10. The electronic device according to claim 7, wherein the one or more programs further cause the at least one processor to:
    adjust a size of the captured image according to a size of the hollowed area of the invoked image template before filling the hollowed area of the invoked image template with the captured image.

11. The electronic device according to claim 10, wherein the size of the captured image is adjusted by:
    enlarging the captured image when the size of the captured image is less than the size of the hollowed area of the invoked image template; and
    reducing the captured image when the size of the captured image is greater than the size of the hollowed area of the invoked image template.

12. The electronic device according to claim 10, wherein the size of the captured image is adjusted by:
    cutting an edge of the captured image when the size of the captured image is greater than the size of the hollowed area of the invoked image template.

13. A non-transitory storage medium having stored thereon instructions that, when executed by a processor of an electronic device, causes the processor to perform a method for capturing images, the electronic device comprising a storage device and a camera device, wherein the method comprises:
    invoking one image template from the storage device, wherein the image template corresponds to a predetermined subject, and an area of the predetermined subject in image templates is predetermined;
    hollowing the predetermined subject of the invoked image template according to the area of the predetermined subject;
    obtaining a hollowed area of the invoked image template;
    controlling the camera device to capture an image according to a user operation;
    obtaining the captured image; and
    filling the hollowed area of the invoked image template with the captured image to generate a complete image.

14. The non-transitory storage medium according to claim 13, wherein the method further comprises:
    indicating the predetermined subject and the area of the predetermined subject in the invoked image template, before hollowing the predetermined subject of the invoked image template.

15. The non-transitory storage medium according to claim 13, wherein the user operation comprises focusing a lens of the camera device to ensure that a size of the captured image is substantially equal to a size of the hollowed area of the invoked image template.

16. The non-transitory storage medium according to claim 13, wherein the method further comprises:
adjusting a size of the captured image according to a size of the hollowed area of the invoked image template before filling the hollowed area of the invoked image template with the captured image.

17. The non-transitory storage medium according to claim 16, wherein the size of the captured image is adjusted by:
enlarging the captured image when the size of the captured image is less than the size of the hollowed area of the invoked image template; and
reducing the captured image when the size of the captured image is greater than the size of the hollowed area of the invoked image template.

18. The non-transitory storage medium according to claim 16, wherein the size of the captured image is adjusted by:
cutting an edge of the captured image when the size of the captured image is greater than the size of the hollowed area of the invoked image template.

* * * * *